(12) United States Patent
Surber et al.

(10) Patent No.: US 9,720,970 B2
(45) Date of Patent: Aug. 1, 2017

(54) EFFICIENT STORAGE AND RETRIEVAL OF FRAGMENTED DATA USING PSEUDO LINEAR DYNAMIC BYTE ARRAY

(71) Applicant: ORACLE INTERNATIONAL CORPORATION, Redwood Shores, CA (US)

(72) Inventors: Douglas Surber, Orinda, CA (US); Jean De Lavarene, Menlo Park, CA (US); Ashok Shivarudraiah, Fremont, CA (US); Edward Shirk, Berkeley, CA (US); Mark Jungerman, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 97 days.

(21) Appl. No.: 14/259,499

(22) Filed: Apr. 23, 2014

(65) Prior Publication Data
US 2014/0380004 A1 Dec. 25, 2014

Related U.S. Application Data

(60) Provisional application No. 61/837,603, filed on Jun. 20, 2013.

(51) Int. Cl.
G06F 12/00 (2006.01)
G06F 13/00 (2006.01)
G06F 17/30 (2006.01)

(52) U.S. Cl.
CPC .............. *G06F 17/30492* (2013.01)

(58) Field of Classification Search
None
See application file for complete search history.

(56) References Cited

U.S. PATENT DOCUMENTS 4,698,749 A * 10/1987 Bhadriraju .......... G06F 12/0623
711/104
6,338,089 B1 1/2002 Quinlan
(Continued)

FOREIGN PATENT DOCUMENTS

| WO | 2006073865 | 7/2006 |
|----|------------|--------|
| WO | 2012037163 | 3/2012 |

OTHER PUBLICATIONS

Anonymous, Database Connection Pool Management, Research Disclosure, Dec. 1, 1998, 3 pages, vol. 41, No. 416, Mason Publications, Hampshire, GB.
(Continued)

*Primary Examiner* — Sean D Rossiter
(74) *Attorney, Agent, or Firm* — Tucker Ellis LLP

(57) ABSTRACT

A system and method for efficient storage and retrieval of fragmented data using a pseudo linear dynamic byte array is provided. In accordance with an embodiment, the system comprises a database driver which provides access by a software application to a database. The database driver uses a dynamic byte array to enable access by the application to data in the database, including determining a size of a required data to be stored in memory, and successively allocating and copying the required data into the dynamic byte array as a succession of blocks. The data stored within the succession of blocks can then be accessed and provided to the application.

20 Claims, 7 Drawing Sheets

(56) References Cited

U.S. PATENT DOCUMENTS

| | | | |
|---|---|---|---|
| 7,174,539 B2 | 2/2007 | Dresselhaus | |
| 7,257,625 B2 | 8/2007 | Wu | |
| 7,978,544 B2 | 7/2011 | Bernard | |
| 8,285,758 B1* | 10/2012 | Bono | G06F 17/30079 707/822 |
| 9,229,993 B2 | 1/2016 | Odenheimer | |
| 2003/0130909 A1* | 7/2003 | Caci | G06Q 30/06 705/26.81 |
| 2004/0088413 A1 | 5/2004 | Bhogi | |
| 2004/0098731 A1 | 5/2004 | Demsey | |
| 2005/0015411 A1* | 1/2005 | Altman | G06F 17/30595 |
| 2005/0028164 A1 | 2/2005 | Neuwald | |
| 2005/0038801 A1 | 2/2005 | Colrain | |
| 2006/0143187 A1* | 6/2006 | Mukkamalla | G06F 17/30592 |
| 2006/0143396 A1 | 6/2006 | Cabot | |
| 2006/0146878 A1 | 7/2006 | Srivastava | |
| 2007/0136311 A1 | 6/2007 | Kasten | |
| 2008/0052370 A1 | 2/2008 | Snyder | |
| 2009/0064199 A1 | 3/2009 | Bidelis et al. | |
| 2009/0094589 A1* | 4/2009 | Gupta | G06F 8/443 717/154 |
| 2009/0282369 A1* | 11/2009 | Jones | G06F 17/30554 715/848 |
| 2011/0154329 A1* | 6/2011 | Arcese | G06F 9/45558 718/1 |
| 2011/0218981 A1 | 9/2011 | Retnakumari | |
| 2012/0066363 A1 | 3/2012 | Somogyi | |
| 2012/0136602 A1 | 5/2012 | Hossain | |
| 2012/0233407 A1 | 9/2012 | Choi | |
| 2013/0018919 A1 | 1/2013 | Peek | |
| 2013/0091153 A1 | 4/2013 | Gitelman | |
| 2013/0144984 A1 | 6/2013 | Zhao | |
| 2014/0129592 A1 | 5/2014 | Samudrala | |
| 2016/0012155 A1* | 1/2016 | Shivarudraiah | G06F 17/30 707/769 |
| 2016/0077761 A1* | 3/2016 | Stabrawa | G06F 3/0604 711/172 |
| 2016/0092365 A1* | 3/2016 | Shivarudraiah | G06F 12/0871 711/118 |

OTHER PUBLICATIONS

International Searching Authority At the European Patent Office, International Search Report and Written Opinion for PCT International Patent Application No. PCT/US2014/035187, Aug. 5, 2014, 11 pages.

Stackoverflow, How to declare a byte array of infinite size/dynamic byte array in Java?, No date, 4 pages. Retrieved from: http://stackoverflow.com/questions/13554302/how-to-declare-a-byte-array-of-infinite-size-dynamic-byte-array-in-java/13554687#13554687.

United States Patent and Trademark Office, Office Action Dated May 17, 2016 for U.S. Appl. No. 14/253,580, 12 Pages.

United States Patent and Trademark Office, Office Action Dated Jul. 29, 2016 for U.S. Appl. No. 14/202,348, 15 Pages.

United States Patent and Trademark Office, Office Action Dated May 19, 2016 for U.S. Appl. No. 14/251,410, 16 Pages.

DBA Administrators, "What is the difference between a connection and a session and how are they related?", 2 pages, retrieved Mar. 23, 2016 from: (http://dba.stackexchange.com/questions/13698/what-is-the-difference-between-a-connection-and-a-session>.

U.S. Office Action dated March 20, 2017 for U.S. Appl. No. 14/253,573, 12 pages.

* cited by examiner

EFFICIENT STORAGE AND RETRIEVAL OF FRAGMENTED DATA USING PSEUDO LINEAR DYNAMIC BYTE ARRAY

CLAIM OF PRIORITY

This application claims the benefit of priority to U.S. Provisional Patent Application titled "EFFICIENT STORAGE AND RETRIEVAL OF FRAGMENTED DATA USING PSEUDO LINEAR DYNAMIC BYTE ARRAY", Application No. 61/837,603, filed Jul. 18, 2013, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to the following U.S. Patent Applications, each of which applications is incorporated herein by reference: U.S. patent application Ser. No. 13/912,086, filed Jun. 6, 2013, titled "SYSTEM AND METHOD FOR CONNECTION LABELING FOR USE WITH CONNECTION POOLS"; U.S. patent application Ser. No. 13/912,098, filed Jun. 6, 2013, titled "SUPPORT FOR CLOUD-BASED MULTI-TENANT ENVIRONMENTS USING CONNECTION LABELING"; U.S. patent application Ser. No. 14/253,580, filed Apr. 15, 2014, titled "SYSTEM AND METHOD FOR PROVIDING A SECOND LEVEL CONNECTION CACHE FOR USE WITH A DATABASE ENVIRONMENT"; U.S. patent application Ser. No. 14/253,573, filed Apr. 15, 2014, titled "SYSTEM AND METHOD FOR PROVIDING A SHARABLE GLOBAL CACHE FOR USE WITH A DATABASE ENVIRONMENT"; U.S. patent application Ser. No. 14/251,410, filed Apr. 11, 2014, titled "SYSTEM AND METHOD FOR MARSHALING MASSIVE DATABASE DATA FROM NATIVE LAYER TO JAVA USING LINEAR ARRAY"; and U.S. patent application Ser. No. 14/202,348, filed Mar. 10, 2014, titled "SYSTEM AND METHOD FOR TRANSPARENT MULTI KEY-VALUE WEIGHTED ATTRIBUTED CONNECTION USING UNI-TAG CONNECTION POOLS".

FIELD OF INVENTION

Embodiments of the invention are generally related to application servers and databases, and are particularly related to a system and method for efficient storage and retrieval of fragmented data using a pseudo linear dynamic byte array.

BACKGROUND

In an application server or database environment which enables access by software applications to data in a database, typically the data retrieved from the database must be allocated in memory arrays or buffers before it can be accessed by the requesting application. However, in some environments, the arrays or buffers allocated in memory for the data can be very large, and can include unused or empty space. This can cause system performance problems, such as out-of-memory errors, and when a virtual machine such as a Java virtual machine is used, excessive thrashing of the virtual machine during garbage collection.

SUMMARY

Described herein is a system and method for efficient storage and retrieval of fragmented data using a pseudo linear dynamic byte array. In accordance with an embodiment, the system comprises a database driver which provides access by a software application to a database. The database driver uses a dynamic byte array to enable access by the application to data in the database, including determining a size of a required data to be stored in memory, and successively allocating and copying the required data into the dynamic byte array as a succession of blocks. The data stored within the succession of blocks can then be accessed and provided to the application.

DETAILED DESCRIPTION

As described above, in an application server/database environment which enables access by software applications to data in a database, typically the data retrieved from the database must be allocated in memory arrays or buffers before it can be accessed by the requesting application. However, in some environments, the arrays or buffers allocated in memory for use with the data can be very large, and can include unused or empty space. This can cause system performance problems, such as out-of-memory errors, and when a virtual machine such as a Java virtual machine is used, excessive thrashing of the virtual machine during garbage collection.

In accordance with an embodiment, described herein is a system and method for efficient storage and retrieval of fragmented data using a pseudo linear dynamic byte array. In accordance with an embodiment, the system comprises a database driver which provides access by a software application to a database. The database driver uses a dynamic byte array to enable access by the application to data in the database, including determining a size of a required data to be stored in memory, and successively allocating and copying the required data into the dynamic byte array as a succession of blocks. The data stored within the succession of blocks can then be accessed and provided to the application.

In accordance with an embodiment, the use of a dynamic byte array is particularly useful for storing and retrieving sparse, variable width, and fixed width, data in Java, and provides performance advantages when the data to be retrieved is large and/or when particular data is repeated.

Figure 1:
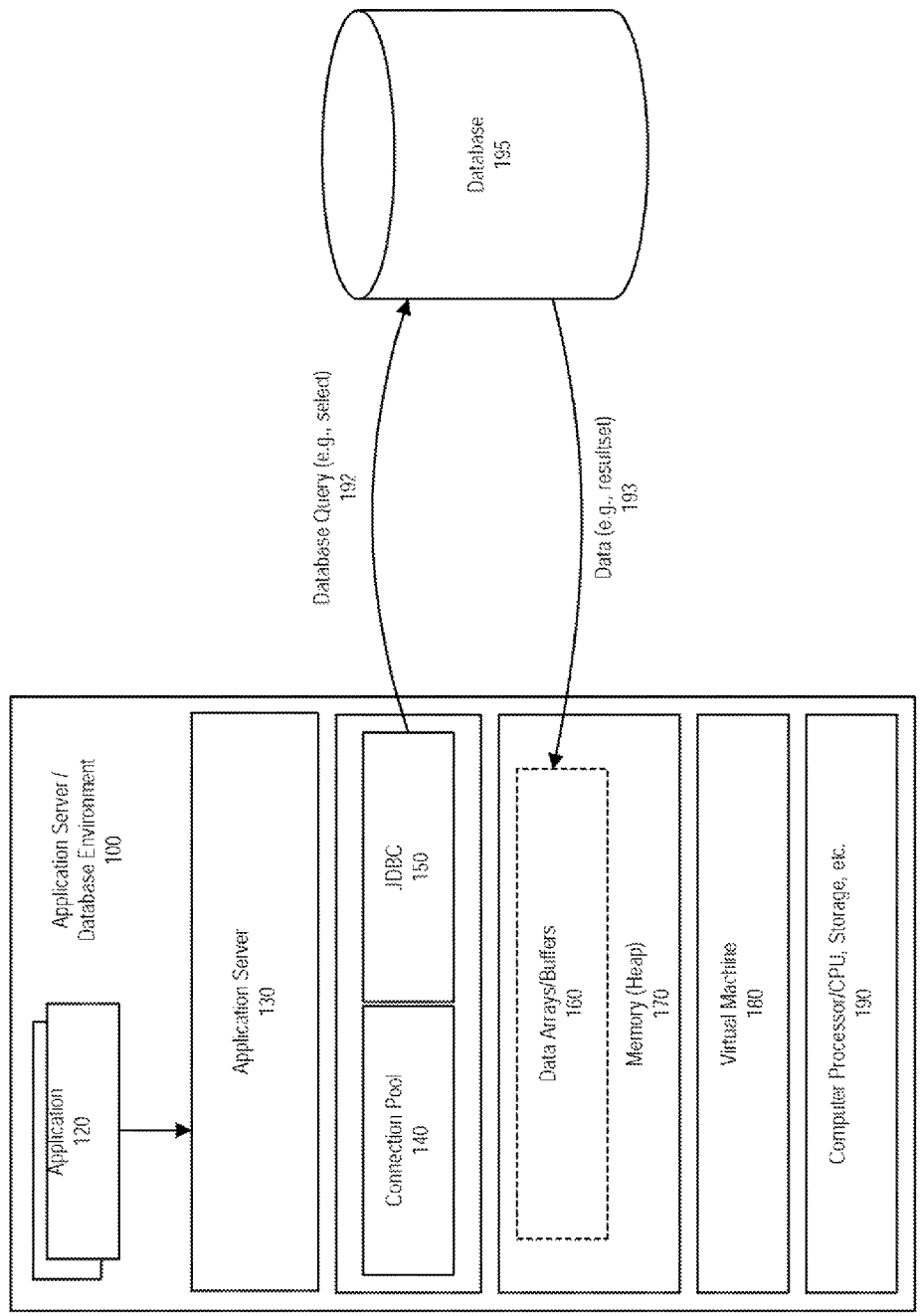
FIG. 1 illustrates a system that can utilize a pseudo linear dynamic byte array, in accordance with an embodiment.

FIG. 1 illustrates a system that can utilize a pseudo linear dynamic byte array, in accordance with an embodiment.

As shown in FIG. 1, by way of example, the system can include an application server or database environment (e.g., an Oracle Fusion Applications environment) 100; a physical computer processor/CPU and storage 190; a virtual machine (e.g., a Java virtual machine) 180; a memory/heap 170; and an application server 130 that enables access by software applications, using a connection pool (e.g., Oracle UCP) 140 and a database driver (e.g., a Java Database Connectivity (JDBC) driver) 150, to access or update data in a database 195.

Depending on the particular embodiment, software applications 120 can be provided internally within the application server itself and located at the same computer, or alternatively can be provided at other locations and act as clients to the application server. The database can be similarly located at the same computer as the application server and/or its applications, or can be provided at other computers in communication via a network.

In accordance with an embodiment, the application server/database environment can also be provided within a cloud environment, and can enable access to the database by multi-user or multi-tenant cloud-based applications.

In accordance with an embodiment, software applications can make requests, such as a database query (e.g., a select) 190, that is communicated to the database. In response, data is returned (e.g., as a resultset 193) to the application server environment, and is stored in memory as one or more data arrays or buffers 160, for use in responding to the application's request.

Generally, whenever an application makes a request to the database, the database driver (e.g., the JDBC driver) must request the virtual machine to allocate sufficient space within the memory/heap to store the required data, so that it can be then used to satisfy the application's request. However, in some environments, the arrays or buffers allocated in memory for use with the data can be very large, and can include unused or empty space.

Figure 2:
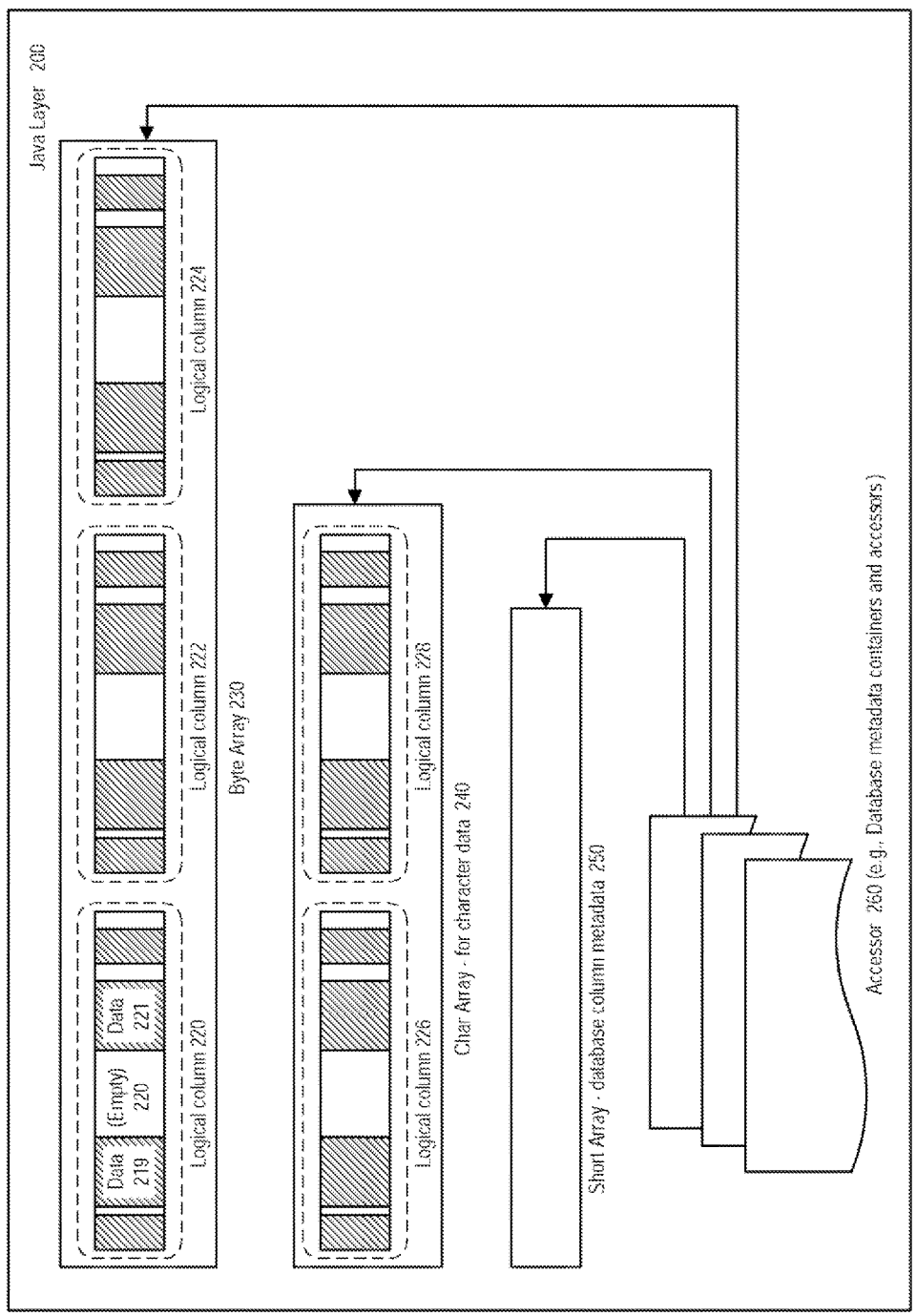
FIG. 2 illustrates storing of data as arrays of data cells which includes gaps after each cell, in accordance with an embodiment.

FIG. 2 illustrates storing of data as arrays of data cells which includes gaps after each cell, in accordance with an embodiment.

As shown in FIG. 2, in some environments, a plurality of arrays or buffers, for example in this illustration a plurality of short 250, char 240, and/or byte arrays 230, can be allocated to store the required data returned from the database by a database query. Each type of array stores a particular data type of the required data. As an illustrative example, the char array can store data from a database column that stores character data, such as last names. Each column in the database can be associated with a corresponding logical column 220 through 228 in these arrays. In accordance with an embodiment, an accessor 260, which includes database metadata, can also be provided to enable access to the data stored in the arrays.

A problem with this approach is that the short, char, and/or byte arrays are usually allocated to accommodate a maximum anticipated size (max_size) of the data expected to be received from the database into that array. As an illustrative example, a particular application may specify that a char array be allocated as a char[2000] array. However, the data that is actually received from the database in response to a request may not require such amount of storage.

For example, if the char[2000] array described above is intended to store last name data, then only a small portion of the allocated array will ultimately be used. As illustrated in FIG. 2, using this technique can result in many holes or empty space (e.g., 220) between fragmented data (e.g., between data 219 and 221).

The above situation can be particularly problematic when, to avoid unnecessary roundtrips for successive data requests, a database query may select multiple columns and multiple rows at the same time, for example 10×10 rows and columns. The amount of memory allocated for such resultset data can quickly grow to several hundred megabytes, and as described above, there may be many holes or empty space within the allocated arrays.

Additionally, the use of such very large arrays can lead to out-of-memory problems. Multiple copies of a same data across several rows may also be stored, which is inefficient.

Software applications can be re-programmed to be careful as to the size of arrays being allocated, to avoid issues such as the above example of a char[2000] array being allocated for use with last name data; or to fetch a smaller, e.g., resultset with one row and one column. However, such workarounds may require customizing the software application for a particular environment, which is unsatisfactory, particularly in multi-user or multi-tenant environments.

Figure 3:
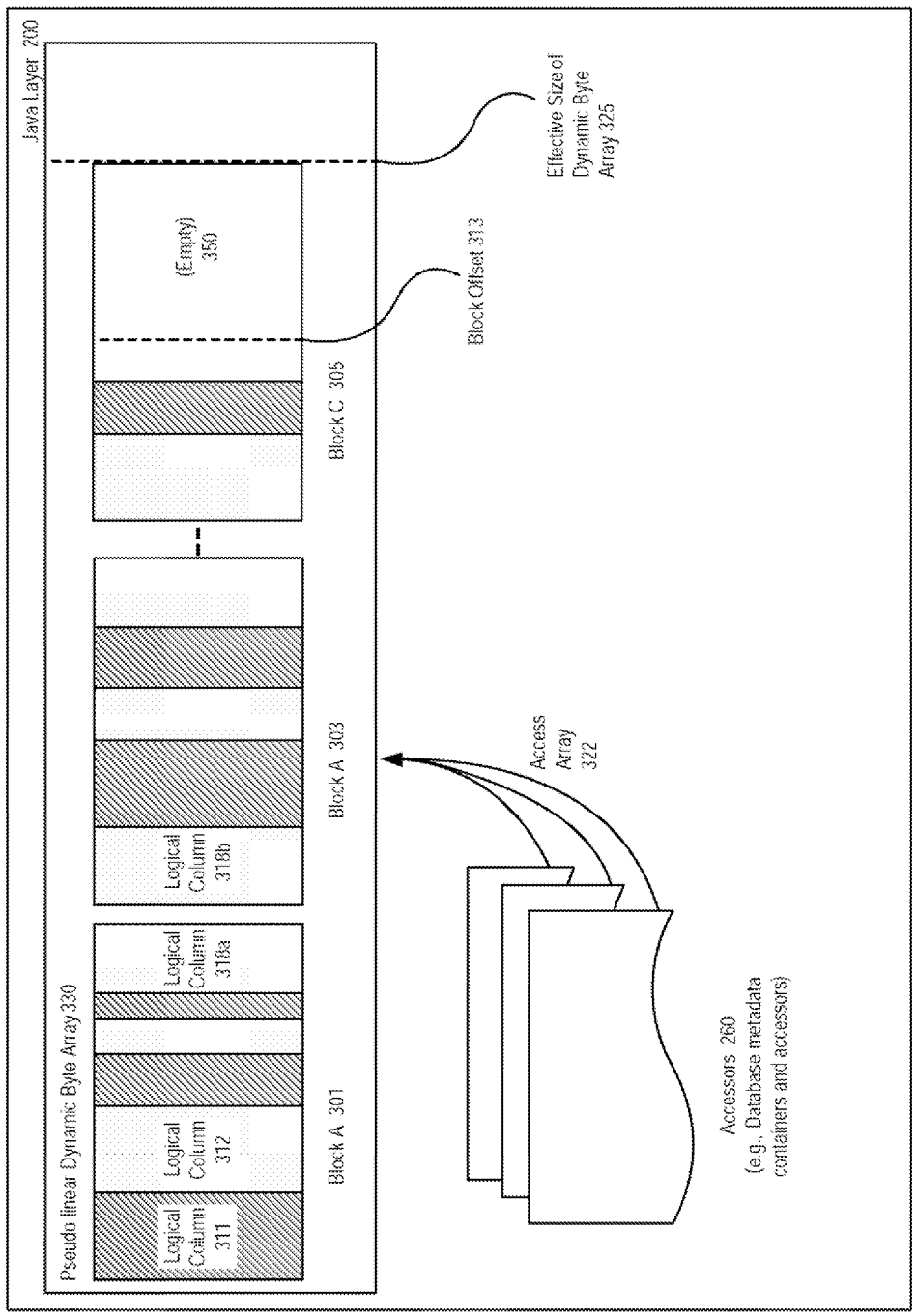
FIG. 3 further illustrates storing of data using a pseudo linear dynamic byte array, in accordance with an embodiment.

FIG. 3 further illustrates storing of data using a pseudo linear dynamic byte array, in accordance with an embodiment.

As shown in FIG. 3, in accordance with an embodiment, instead of the required resultset arrays being allocated as a plurality of arrays or buffers using the techniques described above, a pseudo linear dynamic byte array 330 is used.

In accordance with an embodiment, when space is to be allocated in memory for a required data from the database, the system can ignore the maximum anticipated size (max_size) of the data expected to be received from the database, and instead determine the actual size of the required data, allocate a small block 301 (which in accordance with an embodiment can be a 32k block) from a buffer cache at first, and then dynamically allocate a succession of additional blocks 303 through 305 as necessary, to store the data.

In accordance with an embodiment, offsets can be used to determine when to dynamically allocate additional blocks. In accordance with an embodiment, all the blocks allocated in the pseudo linear dynamic byte array can be the same size.

In accordance with an embodiment, a block can include a plurality of logical columns, e.g., 311 and 312, and a logical column can spread across two different blocks. As an illustrative example, the block 301 does not have enough space to store the whole data of logical column 318. Part of the logical column 318a can be stored in the block 301, and the rest of the logical column 318b can continue in the block 303.

In accordance with an embodiment, a block offset 313 can be used to indicate the position of data in a block, and an effective size 325 of the dynamic byte array can also be provided to keep track of the size of the actual data that has been stored in the dynamic byte array.

This approach results in minimal wastage of memory, e.g., empty space 350, smaller manageable chunks of data, the potential for storing unlimited data size with less risk of out-of-memory problems, and less virtual machine trashing during garbage collection. The technique also supports compression, in that a single copy of data can be stored for the same column data across multiple rows.

Accordingly, using the above example of an application that indicates a char[2000] array will be used for storage of last name data, in accordance with an embodiment, when the last name data is fetched from the database in response to a request, the system will first determine the actual size of the data, and then allocate only a sufficient number of (e.g., 32k) blocks to store the actual data, which results in less unused or empty space.

Listing 1 provides an example pseudocode that illustrates how the system can put data into a pseudo linear dynamic byte array, in accordance with an embodiment.

As illustrated in the example shown in Listing 1, in accordance with an embodiment, during a put operation, the system determines the size of required data to be stored in memory, and successively allocates and copies the required data into a pseudo linear dynamic byte array as a succession of (e.g., 32k) blocks, including determining a last block and using block offsets to determine when to allocate new blocks for storage of the required data. In accordance with other embodiments, different and/or other steps can be used.

Listing 1

```
put(byte[ ]value, long valueOffset, long length)
   if(bytesAvailable == 0) {
       addNewBlockAtEnd( );   //updates bytesAvailable,bOffset
                              // bytesAvailable = block.length;
                              // blockOffset = 0;
   }
   if(length <= bytesAvailable) {
       block = findLastBlock( );
       copyArray(value, valueOffset, block, blockOffset,
           length);
       bytesAvailable -= value.length;
       bOffset += length;
   }
   else{
       block = findLastBlock( );
       copyArray(value, valueOffset, block, blockOffset,
           bytesAvailable);
       valueOffset += bytesAvailable;
       length -= bytesAvailable;
       put(value, valueOffset, length);
   }
```

Listing 2 provides an example pseudocode that illustrates how the system can get data from a pseudo linear dynamic byte array, in accordance with an embodiment.

As illustrated in the example shown in Listing 2, in accordance with an embodiment, during a get operation the system can use the block offsets to determine those blocks in which the data is stored as the succession of blocks, and provide the data to the requesting application. In accordance with other embodiments, different and/or other steps can be used.

Listing 2

```
get(long dbaOffset, byte[ ] outBuffer, int outOffset, long length)
   block = findBlockAtOffset(dbaOffset);
   blockOffset = offset%blockSize;
   bytesLeft = blockSize - blockOffset;
   if(bytesLeft <= length){
      arrayCopy(block,blockOffset,outBuffer,0, length);
   }
```

Listing 2 -continued

```
   else{
      arrayCopy(block,blockOffset, outBuffer, 0, bytesLeft);
      get(dbaOffset+bytesLeft,outBuffer,
         outBuffer+bytesLeft, length - bytesLeft);
   }
```

Figure 4:
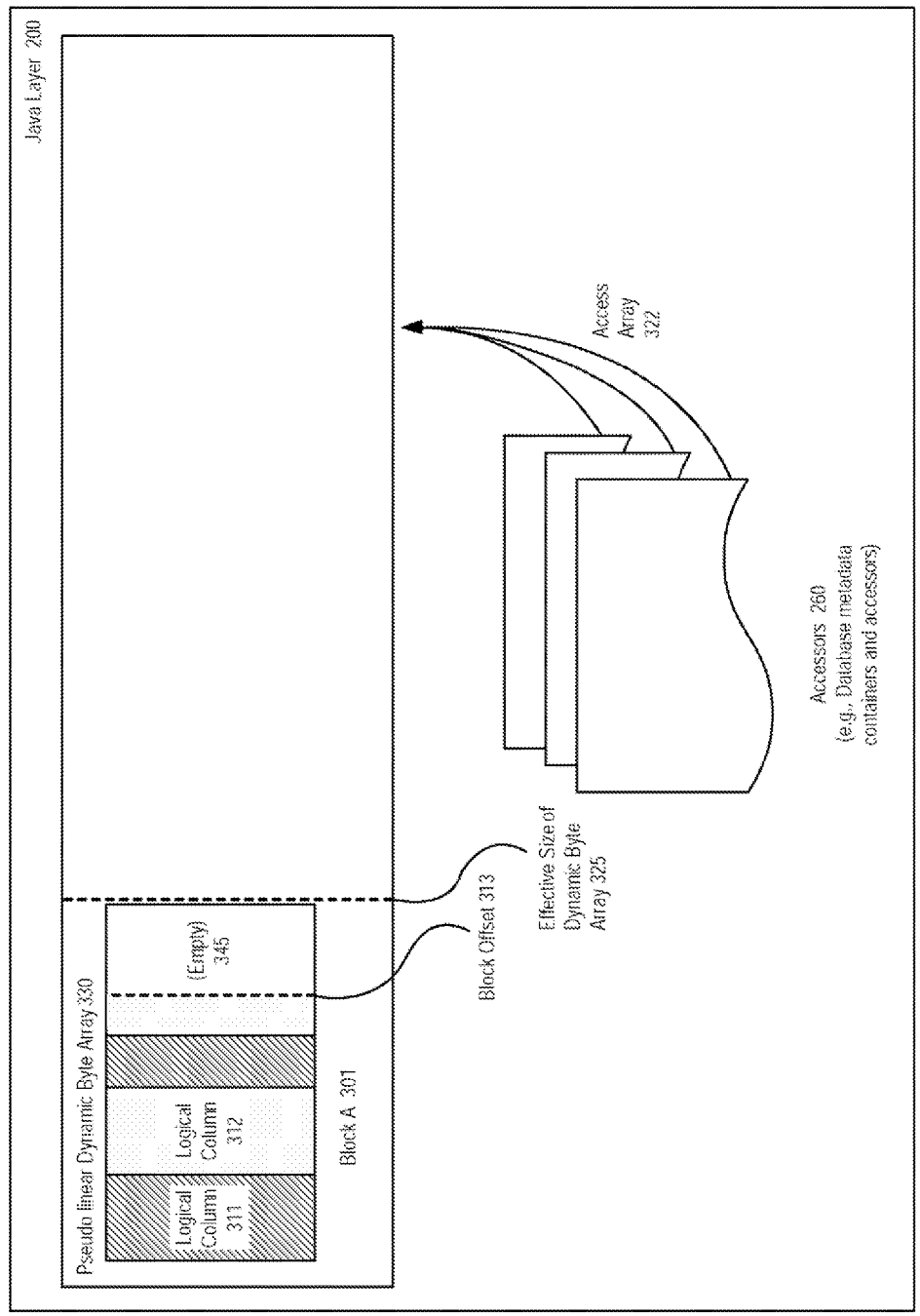
FIG. 4 illustrates storing of data using a pseudo linear dynamic byte array, in accordance with an alternative embodiment.

FIG. 4 illustrates storing of data using a pseudo linear dynamic byte array, in accordance with an alternative embodiment.

In accordance with an embodiment, if the required data is small, e.g., smaller than a typical block size, then the system can allocate a single block of memory (e.g., 32k) 301 to store the required data. This limits the wasted space to the empty space, e.g., empty space 316, in that block.

In accordance with an embodiment, when the required data is first returned from a database query, the block offset 313, which specifies the position of a data stored in the block, can be initially set to zero. As shown in FIG. 4, after the data has been copied to the block, the block offset can be reset to the length of the stored data in the block. In accordance with an embodiment, this block offset can be later used by the system to locate the stored data, so that the requesting application can access the data.

In accordance with an embodiment, the dynamic byte array can store data from database columns of different data types. As an illustrative example, a logical column 311 can store data from a database column of a character type, and the next logical column 312 can store data from a database column of a numeric type.

Figure 5:
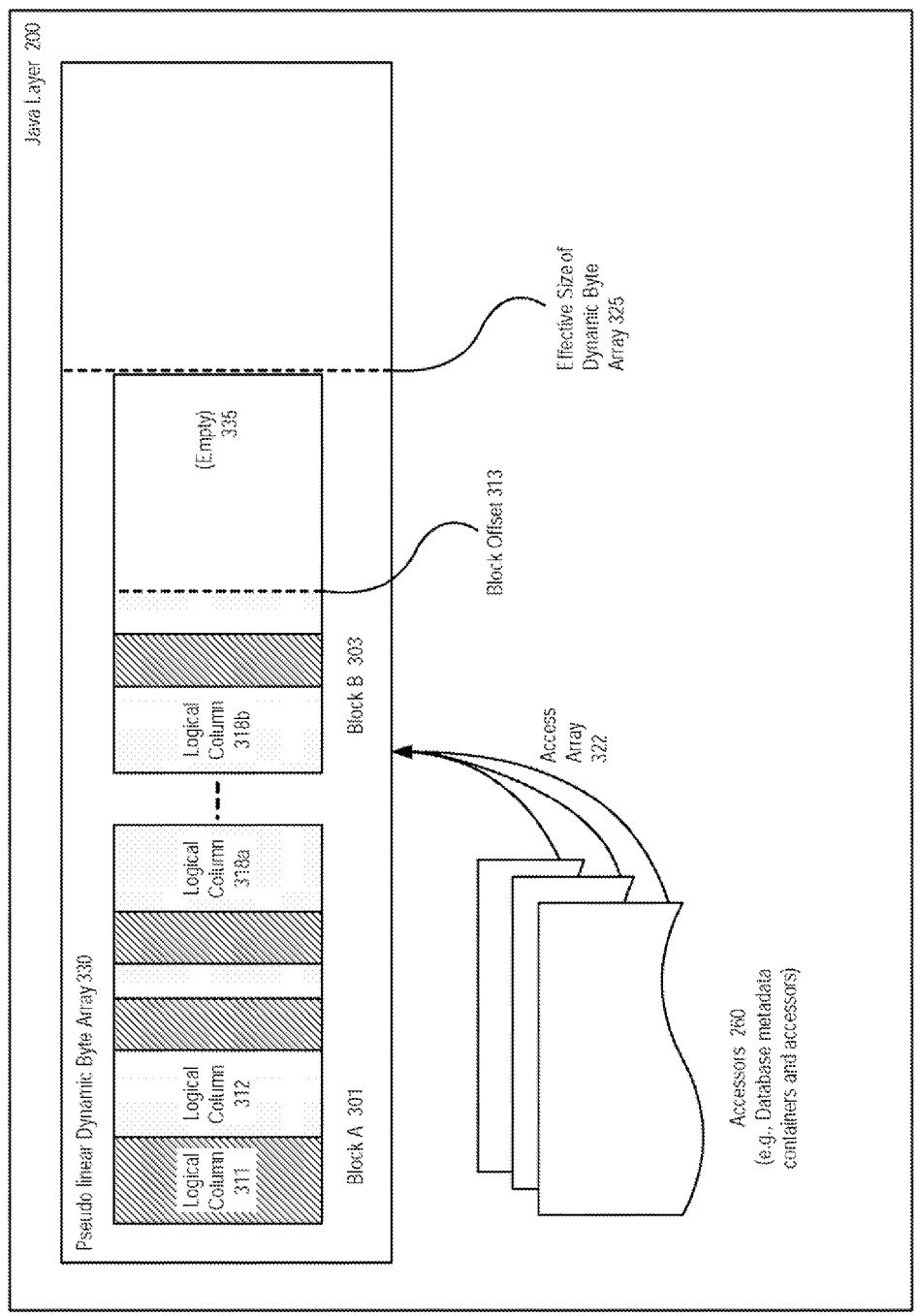
FIG. 5 further illustrates storing of data using a pseudo linear dynamic byte array, in accordance with an alternative embodiment.

FIG. 5 further illustrates storing of data using a pseudo linear dynamic byte array, in accordance with an alternative embodiment.

In accordance with an embodiment, in some instances the required data may be much larger than the size of a typical block (e.g., 32k). In the above-described scenario, in accordance with an embodiment, the system can first determine the size of the required data, and allocate a single block of memory 301. In accordance with an embodiment, the system can subsequently check the space available (e.g., the available bytes) in the block for storing the required data, and then copy part of the required data equivalent to the size of the block to the block.

In accordance with embodiment, the system can use an offset to track the required data that has been copied, so that the system can remember where to continue copying the required data when space is available in the pseudo linear dynamic byte array. In accordance with an embodiment, this offset can be different from the block offset, which is used to track the data stored in a particular block in the pseudo linear dynamic byte array.

As an illustrative example, the offset for tracking the required data can be initially set to zero, and, after data of the size of a block (e.g., 32K) has been copied to the pseudo linear dynamic byte array, the offset can be reset to 32K. In accordance with an embodiment, the block offset can also be set to 32k, which indicates that the whole block has been occupied by the required data.

In accordance with an embodiment, the system can then continue to check the bytes available in the pseudo linear dynamic byte array to store the remaining required data. If the system detects that the bytes/space available within a current block are not enough to store the remaining required data, then a new block, e.g. block B 303, can be allocated, and the block offset can be reset accordingly.

The above steps can be repeated until the required data has been completely copied to the pseudo linear dynamic byte array.

Figure 6:
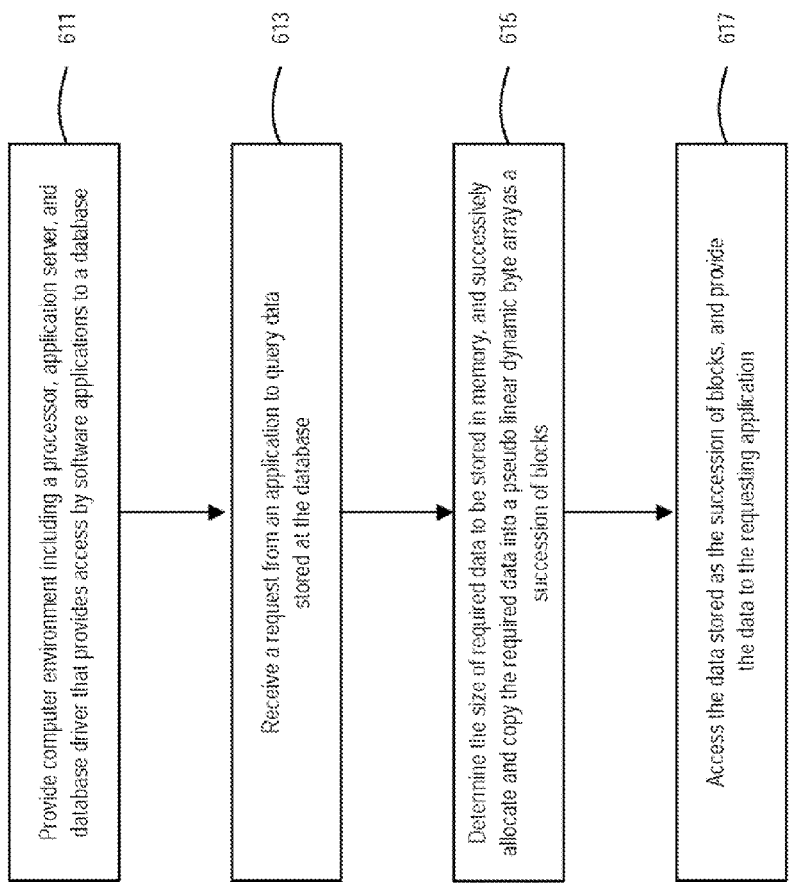
FIG. 6 is a flowchart that illustrates a method of storing data using a pseudo linear dynamic byte array, in accordance with an embodiment.

FIG. 6 is a flowchart that illustrates a method of storing data using a pseudo linear dynamic byte array, in accordance with an embodiment.

As shown in FIG. 6, at step 611, a computer environment is provided, including a processor, application server, and a database driver that provides access by software applications to a database.

At step 613, a request is received from an application to query data stored at the database.

At step 615, the system determines the size of required data to be stored in memory, and successively allocates and copies the required data into a pseudo linear dynamic byte array as a succession of blocks.

At step 617, the system can then access the data stored as the succession of blocks, and provide the data to the requesting application.

Figure 7:
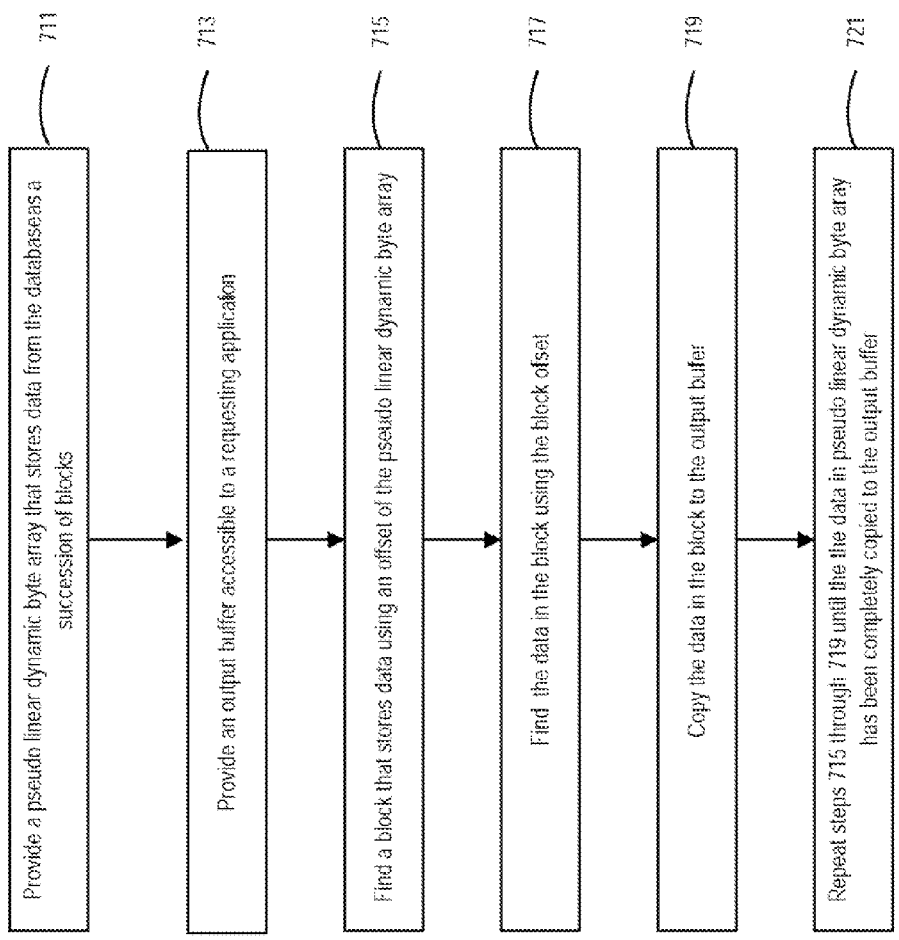
FIG. 7 is a flowchart that further illustrates a method of accessing the data in a pseudo linear dynamic byte array, in accordance with an embodiment.

FIG. 7 is a flowchart that further illustrates a method of accessing the data in a pseudo linear dynamic byte array, in accordance with an embodiment.

As shows in FIG. 7, at step 711, the system provides a pseudo linear dynamic byte array which stores data from the database as a succession of blocks, and, at step 713, an output buffer so that the data in the pseudo linear dynamic byte array can be copied thereto for the requesting application to access.

At step 715, the system can locate a block in the pseudo linear dynamic byte array using an offset, and, at step 717, determine the location of the data in the located block using a block offset.

At step 719, the located data in the block can then be copied to the output buffer. The system can repeat steps 713 through 719, until the data in the pseudo linear dynamic byte array has been completely copied to the output buffer at step 721.

As an illustrative example, in accordance with an embodiment, a block in the pseudo linear dynamic byte array can be located using the size of the data stored therein, and a block offset derived from the data size and the block size can be used to determine the location of a data in the located block.

Embodiments of the present invention may be conveniently implemented using on or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for efficient storage and retrieval of fragmented data using a dynamic byte array, comprising:
a computer including a processor;
an application server, wherein the application server includes
a database driver that provides access by a software application to a database, and
a dynamic byte array to store data retrieved from the database;
wherein the database driver is configured to
determine a size of the data retrieved from the database,
allocate, based on the size of the data, a succession of equal-sized blocks of memory in the dynamic byte array to store the data,
determine a block offset of the data stored in the dynamic byte array, and
copy the data stored as the succession of blocks using the block offset to an output buffer, for access by the software application.

2. The system of claim 1, wherein the database driver is configured to use a block offset indicating a position the data in a block of memory, and an effective size of the dynamic byte array to keep track of the size of the actual data that has been stored in the dynamic byte array.

3. The system of claim 2, wherein the database driver uses the block offset to get the data from the dynamic byte array.

4. The system of claim 1, further comprising a virtual machine that allocates the dynamic byte array in a heap, and wherein the software application is a Java application, and wherein the database driver component is a JDBC driver.

5. The system of claim 1, wherein each block in the pseudo linear dynamic byte array includes a plurality of logic columns of different data types.

6. The system of claim 5, wherein a single copy of data can be stored in a logical column for the same column data across multiple rows.

7. The system of claim 1, wherein an offset is used to track the data that has been copied, so that the database driver remembers where to continue copying the data when space is available in the dynamic byte array.

8. A method for efficient storage and retrieval of fragmented data using a dynamic byte array, comprising:
providing a database driver on an application server executing on a microprocessor, wherein the database driver provides access by a software application to a database, and uses a dynamic byte array to store data retrieved from the database;
determining, using the database driver, a size of the data retrieved from the database,
allocating, based on the size of the data, a succession of equal-sized blocks of memory in the dynamic byte array to store the data;
determining a block offset of the data stored in the dynamic byte array; and copying the data stored as the succession of blocks using the block offset to an output buffer, for access by the software application.

9. The method of claim 8, wherein the database driver is configured to use a block offset indicating a position the data in a block of memory, and an effective size of the dynamic byte array to keep track of the size of the actual data that has been stored in the dynamic byte array.

10. The method of claim 9, wherein the database driver uses the block offset to get the data from the dynamic byte array.

11. The method of claim 8, further comprising providing a virtual machine that allocates the dynamic byte array in a heap, and wherein the software application is a Java application, and wherein the database driver component is a JDBC driver.

12. The method of claim 8, wherein each block in the pseudo linear dynamic byte array includes a plurality of logic columns of different data types.

13. The method claim 8, wherein an offset is used to track the data that has been copied, so that the database driver remembers where to continue copying the data when space is available in the dynamic byte array.

14. A non-transitory computer readable storage medium, including instructions stored thereon which when read and executed by one or more computers cause the one or more computers to perform the steps comprising:

providing a database driver on an application server executing on a microprocessor, wherein the database driver provides access by a software application to a database, and uses a dynamic byte array to store data retrieved from the database;

determining, using the database driver, a size of the data retrieved from the database allocating, based on the size of the data, a succession of equal-sized blocks of memory in the dynamic byte array to store the data;

determining a block offset of the data stored in the dynamic byte array; and copying the data stored as the succession of blocks using the block offset to an output buffer, for access by the software application.

15. The non-transitory computer readable storage medium of claim 14, wherein the database driver is configured to use a block offset indicating a position the data in a block of memory, and an effective size of the dynamic byte array to keep track of the size of the actual data that has been stored in the dynamic byte array.

16. The non-transitory computer readable storage medium of claim 15, wherein the database driver uses the block offset to get the data from the dynamic byte array.

17. The non-transitory computer readable storage medium of claim 14, further comprising providing a virtual machine that allocates the dynamic byte array in a heap, and wherein the software application is a Java application, and wherein the database driver component is a JDBC driver.

18. The non-transitory computer readable storage medium of claim 14, wherein each block in the pseudo linear dynamic byte array includes a plurality of logic columns of different data types.

19. The non-transitory computer readable storage medium of claim 18, wherein a single copy of data can be stored in a logical column for the same column data across multiple rows.

20. The non-transitory computer readable storage medium of claim 14, wherein an offset is used to track the data that has been copied, so that the database driver remembers where to continue copying the data when space is available in the dynamic byte array.

\* \* \* \* \*

UNITED STATES PATENT AND TRADEMARK OFFICE
CERTIFICATE OF CORRECTION

PATENT NO. : 9,720,970 B2  Page 1 of 1
APPLICATION NO. : 14/259499
DATED : August 1, 2017
INVENTOR(S) : Surber et al.

It is certified that error appears in the above-identified patent and that said Letters Patent is hereby corrected as shown below:

In the Drawings

On sheet 7 of 7, in FIGURE 7, under Reference Numeral 717, Line 1, delete "ofset" and insert -- offset --, therefor.

On sheet 7 of 7, in FIGURE 7, under Reference Numeral 719, Line 1, delete "bufer" and insert -- buffer --, therefor.

On sheet 7 of 7, in FIGURE 7, under Reference Numeral 721, Line 1, delete "the the" and insert -- the --, therefor.

On sheet 7 of 7, in FIGURE 7, under Reference Numeral 721, Line 1, delete "aray" and insert -- array --, therefor.

In the Specification

In Column 1, Line 11, delete "Jul. 18, 2013," and insert -- Jun. 20, 2013, --, therefor.

In the Claims

In Column 9, Line 21, in Claim 13, after "method" insert -- of --.

In Column 9, Line 35, in Claim 14, delete "database" and insert -- database, --, therefor.

Signed and Sealed this
Twentieth Day of February, 2018

Andrei Iancu
*Director of the United States Patent and Trademark Office*